Feb. 3, 1931.  W. E. RAWLINGS  1,791,145
ANT TRAP
Filed Dec. 27, 1928
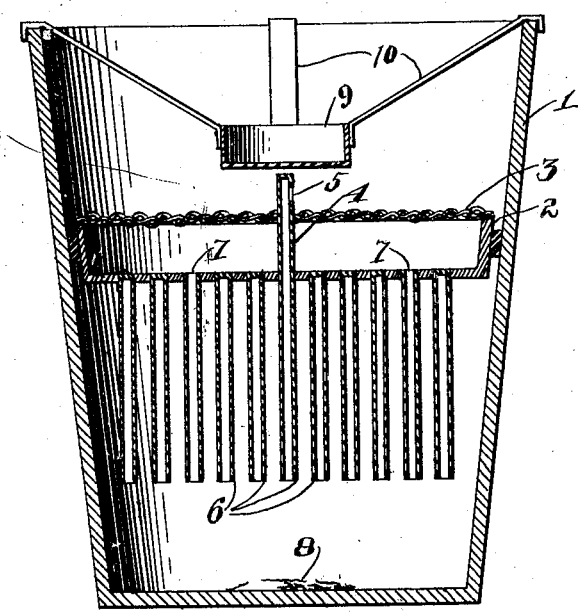
INVENTOR
William E. Rawlings
John A. Naismith
ATTORNEY Patented Feb. 3, 1931

1,791,145

UNITED STATES PATENT OFFICE

WILLIAM E. RAWLINGS, OF NEAR SAN JOSE, CALIFORNIA

ANT TRAP

Application filed December 27, 1928. Serial No. 328,797.

My invention relates particularly to an ant trap so constructed and arranged that a poisonous gas may be introduced therein to destroy the ants therein.

It is one object of the invention to provide a trap of the character indicated adapted to permit the easy ingress of ants thereto but effectually obstruct their egress therefrom.

It is another object of the invention to provide a means whereby a poisonous gas, heavier than air, may be introduced into the trap as desired to effect the destruction of the ants caught therein.

It is also an object of the invention to provide a device of the character indicated that will be simple in form, economical to manufacture, strong, durable and highly efficient in its practical application.

The drawing is a vertical transverse section through a device embodying my invention.

Referring now more particularly to the drawing, I show at 1 a receptacle of any suitable size and form but open at the top in the present instance.

At 2 I show a dish fitted with a rubber gasket around its outer periphery so that when it is placed in the receptacle 1 no passage is left for the passage of ants therebetween, and the top of this dish is covered with a wire screen 3. Passing axially through the dish and its cover 3 is a tube as 4, this tube being open at its lower end and having an opening in its upper end as at 5 above the screen cover 3. Depending from the bottom of the dish 2 are a plurality of tubes as 6, most of these tubes being closed at their upper ends but an occasional one having an opening as 7 into the dish 2. All of the tubes are open at their lower ends as shown, and these tubes terminate at a level somewhat above the bottom of the receptacle as shown.

When the structure including the dish 2 and the parts mounted thereon is in position in the receptacle 1 as shown, and a suitable lure is placed in the receptacle as at 8, the ants may readily enter the receptacle and reach the lure by passing over the screen 3 and through the tube 4, but the maze of tubes 6 which they encounter materially delays their reaching the bait 8. Likewise, after reaching the lure their return to the tube 4 is delayed, if indeed they reach it at all since they are more likely to encounter an opening 7 and pass into the dish 2.

The tubes 6 may be arranged in any suitable manner as, for instance, close together in circular formation, so that the ants will be compelled to travel a long distance in their efforts to reach the lure and then leave the receptacle, travelling into and out of the blind tubes in their search for an opening to the exterior of the receptacle.

In practice the ants are at first given free access to the lure, and then the dish 2 is placed in position, the entering ants soon finding their way to the opening 5 in tube 4.

A feature of this invention is the cup or small receptacle as 9 is suspended within the receptacle 1 by means of arms as 10 hooking over the upper edge thereof. While the ants are active a suitable substance is placed in receptacle 9 that is capable of generating a gas that is destructive to ant life and that is heavier than air. This may be accomplished by the slow generation of carbon dioxide gas in the cup 9, the gas sinking to the bottom of the receptacle 1 through openings 7 and destroying the ants as they seek to find their way out.

It is to be understood, of course, that while I have herein shown and described but one specific embodiment of the invention, changes in form, construction and method of assembly and operation may be made within the scope of the appended claims.

I claim:

1. An ant trap comprising a receptacle, an apertured barrier mounted therein to form a substantially closed chamber therein, means mounted in the chamber to obstruct the passage of ants therethrough, and an apertured tube extending through the barrier to a point thereover.

2. An ant trap comprising a receptacle, a dish mounted therein to form a substantially closed lower chamber therein, and having a plurality of orifices in its bottom, a screen cover for the dish, a tube open at its lower end passing through the dish and cover and extending a distance above and below the same and having an opening formed therein at its upper end, and a maze mounted in the chamber below the dish and in the path of travel of the ants entering and leaving the chamber.

3. An ant trap comprising a receptacle, an ant detaining device mounted in the receptacle a distance below its upper edge, to form a stubstantially closed lower chamber therein, and a receptacle for poison mounted in the receptacle a distance below its upper edge but above the detaining device whereby poisonous gas may be generated in the second named receptacle and fed continuously to the lower chamber.

4. An ant trap comprising a receptacle, a dish mounted therein to form a substantially closed lower chamber therein, and having orifices in its bottom, a maze mounted in the chamber to obstruct the passage of ants therethrough, and a receptacle for poison mounted in the first named receptacle a distance below its upper edge and above the said dish whereby a gas that is destructive of ant life and heavier than air may be continuously generated in the receptacle and fed to the lower chamber.

WILLIAM E. RAWLINGS.